(12) United States Patent
Wei

(10) Patent No.: US 8,819,372 B2
(45) Date of Patent: Aug. 26, 2014

(54) PREVENTING DATA LOSS DURING REBOOT AND LOGICAL STORAGE RESOURCE MANAGEMENT DEVICE

(75) Inventor: Wei Wei, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 14/005,148

(22) PCT Filed: Mar. 31, 2012

(86) PCT No.: PCT/CN2012/073387
§ 371 (c)(1),
(2), (4) Date: Oct. 4, 2013

(87) PCT Pub. No.: WO2012/155707
PCT Pub. Date: Nov. 22, 2012

(65) Prior Publication Data
US 2014/0059314 A1     Feb. 27, 2014

(30) Foreign Application Priority Data
May 13, 2011 (CN) .......................... 2011 1 0124517

(51) Int. Cl.
   *G06F 12/00*     (2006.01)
   *G06F 3/06*     (2006.01)
   *G06F 11/14*     (2006.01)
   *G06F 12/10*     (2006.01)
   *G06F 9/44*     (2006.01)

(52) U.S. Cl.
   CPC ............ *G06F 3/0631* (2013.01); *G06F 3/0604* (2013.01); *G06F 11/1417* (2013.01); *G06F 2212/1032* (2013.01); *G06F 2212/174* (2013.01); *G06F 3/067* (2013.01); *G06F 2212/1016* (2013.01); *G06F 9/4401* (2013.01); *G06F 12/1009* (2013.01)
   USPC ............................ 711/162; 711/206; 711/173

(58) Field of Classification Search
   CPC ... G06F 3/067; G06F 3/00604; G06F 3/0619; G06F 3/0631; G06F 12/0238; G06F 12/00; G06F 12/02; G06F 12/0246; G06F 12/08; G06F 12/16; G06F 11/1417
   USPC ......................................................... 711/162
   See application file for complete search history.

(56) References Cited

FOREIGN PATENT DOCUMENTS

| CN | 1908917 A | 2/2007 |
|---|---|---|
| CN | 1991776 | 7/2007 |

(Continued)

OTHER PUBLICATIONS

CN First Office Action dated Nov. 28, 2012 issued on CN Patent Application No. 201110124517.8 dated May 13, 2011, The State Intellectual Property Office, P.R. China.

(Continued)

*Primary Examiner* — Reginald Bragdon
*Assistant Examiner* — Hannah A Faye-Joyner

(57) ABSTRACT

According to an example, in a method for preventing data loss during reboot, a logical storage resource management device may pre-allocate reserved memory for storing a storage resource mapping table, allocate logical storage resources to a data source device before a system is rebooted, record, in the storage resource mapping table, a physical location of the logical storage resources into which data has been written when the data source device writes the data into the logical storage resources, obtain the physical location of the logical storage resources into which the data has been written from the storage resource mapping table when the system is rebooted, set a state of a physical memory block corresponding to the logical storage resources into which the data has been written as used, and release all logical storage resources after the data source device reads the data.

15 Claims, 3 Drawing Sheets

(56) References Cited

FOREIGN PATENT DOCUMENTS

| CN | 101710253 | 5/2010 |
| CN | 101833514 | 9/2010 |
| CN | 101916201 | 12/2010 |
| CN | 101923499 | 12/2010 |
| CN | 102033823 | 4/2011 |
| CN | 102184145 | 9/2011 |
| JP | 2005157748 | 6/2005 |

OTHER PUBLICATIONS

International Search Report and Written Opinion dated Jun. 28, 2012 issued on PCT Patent Application No. PCT/CN2012/073387 dated Mar. 31, 2012, The State Intellectual Property Office, the P.R. China.

US 8,819,372 B2

PREVENTING DATA LOSS DURING REBOOT AND LOGICAL STORAGE RESOURCE MANAGEMENT DEVICE

CLAIM FOR PRIORITY

The present application is a national stage filing under 35 U.S.C 371 of PCT application number PCT/CN2012/073387, having an international filing date of Mar. 31, 2012, which claims priority to Chinese Patent Application No. 201110124517.8, filed on May 13, 2011, the disclosures of which are hereby incorporated by reference in their entireties.

BACKGROUND

Requirements for the high reliability of a system have gradually increased. In one regard, higher-layer software asks the system to store some data before reboot. In this way, the system can read the data after reboot, so as to rapidly recover operation data and further decrease the shutdown time of the system.

In a general purpose computer system, such as a PC or a server, a non-volatile memory, for instance, a disk and a data card, may be used to realize the above function. However, an embedded system (a system which is designed for a specific purpose, e.g. a network device such as a router or switch), may not have such non-volatile memory. Moreover, since the access rate of the disk and the data card is relatively slow, if the disk and the data card are used to realize the above function in a case that high reliability is required and the amount of data is large, the shutdown time of the system will be relatively long.

In a common embedded system, reserved memory is used to realize the above function. The reserved memory is memory reserved by the embedded device for a certain purpose. When the system is initiated, the reserved memory is not managed by a memory management system. The reserved memory has a characteristic of preventing data loss during reboot, and thus can be used to store data which should be reserved before reboot and is to be read when the next reboot, for instance, the data may be reboot information.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Compared with the access rate of a disk and a data card, the access rate of memory is much higher. If the amount of data is large, more reserved memory is required, which may result in that 30%~40% memory of a system being used as reserved memory. Once the memory is used as reserved memory, the memory cannot be used to store general data. In this way, once rapid recovery is to be supported, the performance of the system may be greatly decreased, or additional memory is needed.

Detailed description will be made hereinafter with reference to the accompanying drawings and specific examples.

Figure 1:
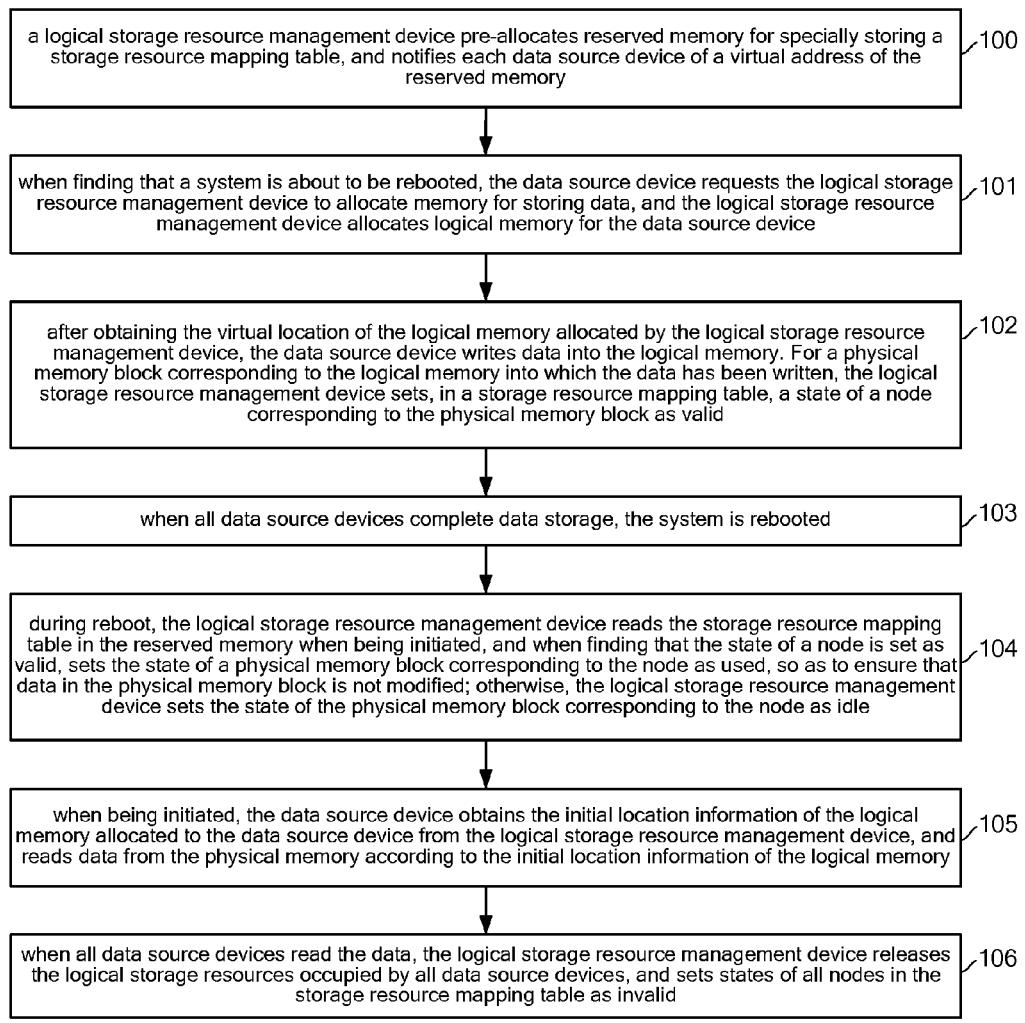
FIG. 1 is a flowchart of a method for preventing data loss during reboot when there is no support of a file system according to an example of the present disclosure.

FIG. 1 is a flowchart of a method for preventing data loss during reboot when there is no support of a file system according to an example. As shown in FIG. 1, the method includes the following operations.

Block 100: a logical storage resource management device pre-allocates reserved memory for specially storing a storage resource mapping table, and notifies each data source device of a virtual address of the reserved memory.

Herein, the data source device is an object for storing data, for instance, the object may be a software item in a device. The logical storage resource management device notifies each data source device of the virtual address of the reserved memory, for instance, an Application Programming Interface (API), and the data source device may perform read and write operations for the reserved memory according to the virtual address.

Block 101: when finding that a system is about to be rebooted, the data source device requests the logical storage resource management device to allocate memory for storing data, and the logical storage resource management device allocates logical memory for the data source device. The logical memory may be referred to as logical storage resources.

In this operation, the logical storage resource management device provides a virtual location of the logical memory, for instance, a virtual page frame number or a virtual address, to the data source device. For example, if the system adopts a Copy-On-Write technology of Linux/UNIX, the logical storage resource management device provides a virtual address space, for instance, an address space from 0x00123400 to 0x001243ff, to the data source device as the memory address.

Block 102: after obtaining the virtual location of the logical memory allocated by the logical storage resource management device, the data source device writes data into the logical memory. For a physical memory block corresponding to the logical memory into which the data has been written, the logical storage resource management device sets, in a storage resource mapping table, a state of a node corresponding to the physical memory block as valid.

The data source device obtains the virtual location of the logical memory from the logical storage resource management device, and thus the true physical memory is requested for when missing page abnormity is caused because the data source device writes the data into the logical memory according to the virtual location of the logical memory. Specifically, when the data source device writes the data according to the virtual location of the logical memory, since the true physical memory is not allocated, a missing page abnormity is caused. At this time, the logical storage resource management device allocates the true physical memory to the data source device and writes a corresponding relationship between the virtual location information and the physical location information of the physical memory into a page table, and the data source device writes the data into the physical memory. The physical location information may include a physical page frame number, a physical address and so on, and the virtual location information includes a virtual page frame number, a virtual address and so on.

When allocating the physical memory to the data source device, the logical storage resource management device records the physical location information (for instance, a physical page frame number or a physical address) of each physical memory block in turn in each node of the storage resource mapping table, and sets the state of each node as invalid. When the data source device writes the data into a physical memory block, the logical storage resource management device sets, in the storage resource mapping table, the state of a node corresponding to the physical memory block as valid.

In the storage resource mapping table, each frame corresponds to one item, and each item represents one page of the physical memory. For example, the 0th node represents the 0th page of the physical memory, the 1st node represents the 1st page of the physical memory, . . . , and the 100th node represents the 100th page of the physical memory. That is to say, each frame stores a mapping relation between a logical address and physical memory. At the beginning, each frame does not store any data, and after some data is stored, it is indicated that the frame stores a corresponding mapping relation.

When there is one data source device, the system needs to record initial location information of logical memory corresponding to the data source device. When there are multiple data source devices, the system needs to record a corresponding relationship between the identity of each data source device and the initial location information of logical memory corresponding to the data source device. The initial location information may be an initial virtual page frame number or an initial virtual address.

Block 103: when all data source devices complete data storage, the system is rebooted.

The size of the physical memory obtained by the data source device may be larger than that of the physical memory actually used for storing the data. And thus, the state of a node corresponding to a physical memory block into which no data has been written is set as invalid in the storage resource mapping table.

Block 104: during reboot, the logical storage resource management device reads the storage resource mapping table in the reserved memory when being initiated, and when finding that the state of a node is set as valid, sets the state of a physical memory block corresponding to the node as used, so as to ensure that data in the physical memory block is not modified; otherwise, the logical storage resource management device sets the state of the physical memory block corresponding to the node as idle.

After the state of the physical memory block is set as idle, other devices may use the physical memory block, that is, other devices may perform read and write operations for the physical memory block.

Block 105: when being initiated, the data source device obtains the initial location information of the logical memory allocated to the data source device from the logical storage resource management device, and reads data from the physical memory according to the initial location information of the logical memory.

Block 106: when all data source devices read the data, the logical storage resource management device releases the logical storage resources occupied by all data source devices, and sets states of all nodes in the storage resource mapping table as invalid.

Figure 2:
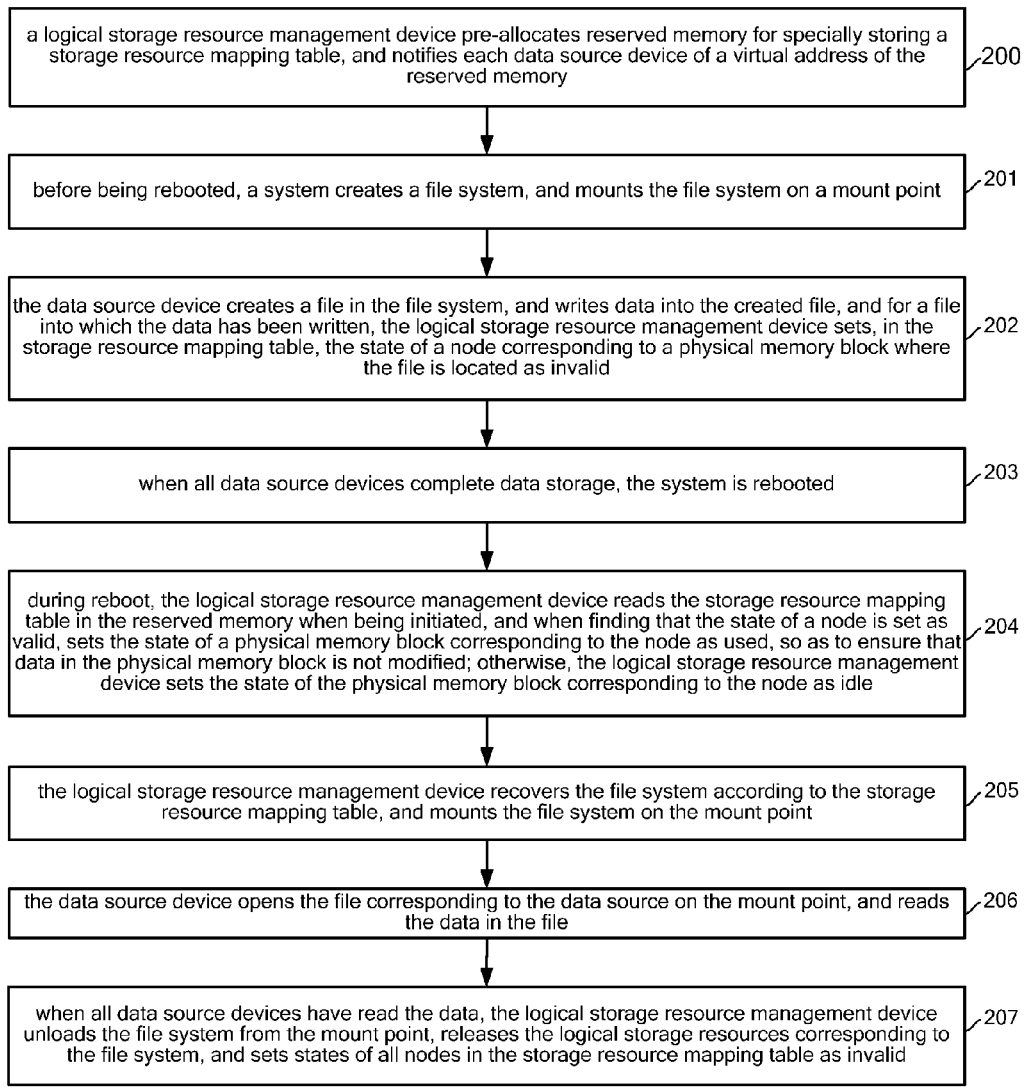
FIG. 2 is a flowchart of a method for preventing data loss during reboot when there is support of a file system according to an example of the present disclosure.

FIG. 2 is a flowchart of a method for preventing data loss during reboot when there is support of a file system according to an example. As shown in FIG. 2, the method includes the following operations.

Block 200: a logical storage resource management device pre-allocates reserved memory for specially storing a storage resource mapping table, and notifies each data source device of a virtual address of the reserved memory.

Block 201: before being rebooted, a system creates a file system, and mounts the file system on a mount point.

The file system may be thought of as a type of logical storage resources. The system takes the logical storage resources as a block device, provides a driving interface for the logical storage resources, and mounts the logical storage resources on one mount point.

The mount point may, for instance, be a storage path of the file system. The mount point may be configured in advance, or may be allocated temporarily. If the mount point is allocated temporarily, the system needs to notify each data source device of the mount point.

Block 202: the data source device creates a file in the file system, and writes data into the created file, and for a file into which the data has been written, the logical storage resource management device sets, in the storage resource mapping table, the state of a node corresponding to a physical memory block where the file is located as invalid.

The data source may define a file name according to a preset rule.

When the data source device writes the data into the file, since true physical memory is not allocated, missing page abnormity is caused. At this time, the logical storage resource management device allocates the true physical memory to the data source device, and the data source device writes the data into the physical memory.

When allocating the physical memory to the data source device, the logical storage resource management device records the physical location information (for instance, a physical page frame number or a physical address) of each physical memory block in turn in each node of the storage resource mapping table, and sets the state of each node as invalid. When the data source device writes the data into a physical memory block, the logical storage resource management device sets, in the storage resource mapping table, the state of a node corresponding to the physical memory block as valid.

Block 203: when all data source devices complete data storage, the system is rebooted.

Block 204: during reboot, the logical storage resource management device reads the storage resource mapping table in the reserved memory when being initiated, and when finding that the state of a node is set as valid, sets the state of a physical memory block corresponding to the node as used, so as to ensure that data in the physical memory block is not modified; otherwise, the logical storage resource management device sets the state of the physical memory block corresponding to the node as idle.

Block 205: the logical storage resource management device recovers the file system according to the storage resource mapping table, and mounts the file system on the mount point.

The mount point in this operation is the same as that in block 201.

Block 206: the data source device opens the file corresponding to the data source on the mount point, and reads the data in the file.

Usually, the data source device defines a file name according to a preset rule when creating the file. And thus, in this operation the data source device may obtain the file name of the file corresponding to the data source device according to the preset rule, so as to open the file.

Block 207: when all data source devices have read the data, the logical storage resource management device unloads the file system from the mount point, releases the logical storage resources corresponding to the file system, and sets states of all nodes in the storage resource mapping table as invalid.

It should be understood that, in this example, the physical memory is invisible to the data source device, and storage and read operations of the data are realized through operating the logical memory or the file system. Actually, when the data source device performs read and write operations for the logical memory or the file system, the operation system performs a read or write operation for the physical memory according to the operation of the data source device.

Figure 3:
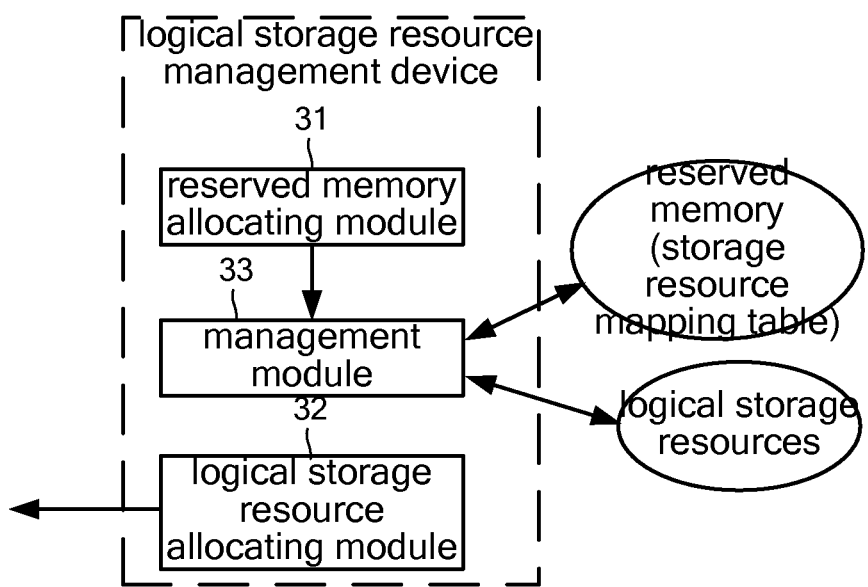
FIG. 3 is a schematic diagram illustrating the structure of a logical storage resource management device according to an example of the present disclosure.

FIG. 3 is a schematic diagram illustrating the structure of a logical storage resource management device according to an example. As shown in FIG. 3, the logical storage resource management device includes a reserved memory allocating module 31, a logical storage resource allocating module 32 and a management module 33. The logical storage resource management device and above mentioned modules may, for example, be implemented as machine readable instructions stored in a memory or other non-transitory storage medium and executable by a processor.

The reserved memory allocating module 31 is to pre-allocate reserved memory for specially storing a storage resource mapping table, and send a virtual address of the reserved memory to the management module 33.

The logical storage resource allocating module 32 is to allocate logical storage resources to a data source device before a system is rebooted.

The management module 33 is to receive and record the virtual address of the reserved memory sent by the reserved memory allocating module 31, and when the data source device writes data into the logical storage resources, record, according to the virtual address of the reserved memory, a physical location of the logical storage resources into which the data has been written in the storage resource mapping table; when the system is rebooted, obtain the physical location of the logical storage resources into which the data has been written from the storage resource mapping table, set a state of a physical memory block corresponding to the logical storage resources into which the data has been written as used, and after all data source devices have read the data, release the logical storage resources occupied by all of the data source devices.

The logical storage resources may be logical memory or a file system.

The management module 33 is further to set a state of a physical memory block corresponding to logical storage resources into which no data has been written as idle when setting the state of the physical memory block corresponding to the logical storage resources into which the data has been written as used.

The management module 33 is further to record, in the storage resource mapping, the physical location of the physical memory block corresponding to the logical storage resources into which the data has been written, set a state of the physical memory block corresponding to the logical storage resources into which the data has been written as valid, and set states of all nodes in the storage resource mapping table as invalid when releasing all logical storage resources.

If the system has no support of the file and the logical storage resources are logical memory, the logical storage resource allocating module 32 is to, when the data source device requests for logical memory for storing the data after finding that the system will be rebooted, allocate the logical memory to the data source device. The management module 33 is further to, when missing page abnormity is caused because the data source device writes the data into the logical memory, allocate physical memory to the data source device, so that the data source device writes the data into the physical memory.

The management module 33 is further to provide an initial address of the logical storage resources to the data source device after setting the state of the physical memory block corresponding to the logical storage resources into which the data has been written as used, so that the data source device reads the data from the logical storage resources according to the initial address.

If the system has the support of the file and the logical storage resources are a file system, the management module 33 is further to, when the missing page abnormity is caused because the data source device writes the data into a file created in the file system, allocate physical memory to the data source device, so that the data source device writes the data into the physical memory.

Compared with the conventional technologies, in these examples, the storage resources are occupied in a period of time from a time point that the system is rebooted to a time point that the data source device reads data. After the data source device reads the data, the storage resources are released. In this way, the storage resources will not be always occupied, so as to improve the utility of the storage resources.

The methods described in this disclosure and the logical storage management device and modules can be implemented by hardware, software or firmware or a combination thereof. For example the storage resource management device and above mentioned functional modules may be implemented by a processor (the term processor is to be interpreted broadly to include a CPU, processing unit, ASIC, logical unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules be implemented as machine readable instructions executable by one or more processors, hardware logical circuitry of the one or more processors or a combination thereof. Further the teachings herein may be implemented in the form of machine readable instructions stored in a memory or other non-transitory storage medium, and executable by the processor to implement the methods and operations described above.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for preventing data loss during reboot, comprising:

pre-allocating, by a logical storage resource management device, reserved memory for storing a storage resource mapping table;

allocating, by the logical storage resource management device, logical storage resources to a data source device before a system is rebooted, and recording, in the storage resource mapping table, a physical location of the logical storage resources into which data has been written when the data source device writes the data into the logical storage resources; and obtaining, by the logical storage resource management device, the physical location of the logical storage resources into which the data has been written from the storage resource mapping table when the system is rebooted, setting a state of a physical memory block corresponding to the logical storage resources into which the data has been written as used, and releasing all logical storage resources after the data source device reads the data.

2. The method of claim 1, further comprising:

when the logical storage resource management device sets the state of the physical memory block corresponding to the logical storage resources into which the data has been written as used, setting, by the logical storage resource management device, a state of a physical memory block corresponding to logical storage resources into which no data has been written as idle.

3. The method of claim 1, wherein recording, in the storage resource mapping table, a physical location of the logical storage resources into which data has been written comprises:

recording, by the logical storage resource management device in the storage resource mapping table, a physical location of the physical memory block corresponding to the logical storage resources into which the data has been written, and setting the state of the physical memory block as valid;

after the logical storage resource management device releases all the logical storage resources, the method further comprises:

setting, by the logical storage resource management device, states of all nodes in the storage resource mapping table as invalid.

4. The method of claim 1, wherein the system has no support of a file and the logical storage resources are logical memory;

wherein allocating, by the logical storage resource management device, logical storage resources to a data source device comprises: requesting, by the data source device, the logical storage resource management device for the logical memory for storing data when finding that the system is to be rebooted, and allocating, by the logical storage resource management device, the logical memory to the data source device;

the data source device writes the data into the logical storage resources comprises: the data source device writes the data into the logical memory;

the method further comprises: causing missing page abnormity when the data source device writes the data into the logical memory, allocating, by the logical storage resource management device, physical memory to the data source device, and writing, by the data source device, the data into the physical memory.

5. The method of claim 1, after the logical storage resource management device sets the state of the physical memory block corresponding to the logical storage resources into which the data has been written as used, further comprising:

providing, by the logical storage resource management device, an initial address of the logical storage resources to the data source device, so that the data source device reads the data from the logical storage resources according to the initial address.

6. The method of claim 1, wherein the system has support of a file and the logical storage resources are a file system;

wherein the data source writes the data into the logical storage resources by:

creating, by the data source device, the file in the file system, and writing the data into the created file;

the method further comprises: causing missing page abnormity when the data source device writes the data into the created file, allocating, by the logical storage resource management device, physical memory to the data source device, and writing, by the data source device, the data into the physical memory.

7. A logical storage resource management device, comprising:

a memory on which is stored:

a reserved memory allocating module to pre-allocate reserved memory for storing a storage resource mapping table;

a logical storage resource allocating module to allocate logical storage resources to a data source device before a system is rebooted; and a management module to, when the data source device writes data into the logical storage resources, record, in the storage resource mapping table, a physical location of the logical storage resources into which the data has been written; when the system is rebooted, obtain the physical location of the logical storage resources into which the data has been written from the storage resource mapping table, set a state of a physical memory block corresponding to the logical storage resources into which the data has been written as used, and after all data source devices read the data, release the logical storage resources; and a processor to execute the reserved memory allocating module, the logical storage resource allocating module, and the management module.

8. The logical storage resource management device of claim 7, wherein the management module is further to set a state of a physical memory block corresponding to logical storage resources into which no data has been written as idle when setting the state of the physical memory block corresponding to the logical storage resources into which the data has been written as used.

9. The logical storage resource management device of claim 7, wherein the management module is further to record, in the storage resource mapping, a physical location of the physical memory block corresponding to the logical storage resources into which the data has been written, set a state of the physical memory block valid in the storage resource mapping table, and set states of all nodes in the storage resource mapping table as invalid after releasing all logical storage resources.

10. The logical storage resource management device of claim 7, wherein the system has no support of a file and the logical storage resources are logical memory;

the logical storage resource allocating module is to allocate the logical memory to the data source device when the data source device requests for the logical memory for storing data after finding that the system is to be rebooted;

the management module is further to allocate physical memory to the data source device when missing page abnormity is caused because the data source device writes the data into the logical memory, so that the data source device writes the data into the physical memory.

11. The logical storage resource management device of claim 7, wherein the management module is further to, after setting the state of the physical memory block corresponding to the logical storage resources into which the data has been written as used, provide an initial address of the logical storage resources to the data source device, so that the data source device reads the data from the logical storage resources according to the initial address.

12. The logical storage resource management device of claim 7, wherein the system has support of a file and the logical storage resources are a file system;

the management module is further to, when missing page abnormity is caused because the data source device writes the data into the created file in the file system, allocate physical memory to the data source device, so that the data source device writes the data into the physical memory.

13. A non-transitory computer readable storage medium on which is stored machine readable instructions that when executed by a processor, causes the processor to:

pre-allocate reserved memory for storing a storage resource mapping table;

allocate logical storage resources to a data source device before a system is rebooted, and recording, in the storage resource mapping table, a physical location of the logical storage resources into which data has been written when the data source device writes the data into the logical storage resources;

obtain the physical location of the logical storage resources into which the data has been written from the storage resource mapping table when the system is rebooted;

set a state of a physical memory block corresponding to the logical storage resources into which the data has been written as used; and release all logical storage resources after the data source device reads the data.

14. The non-transitory computer readable storage medium of claim 13, wherein the machine readable instructions are further to cause the processor to:

set a state of a physical memory block corresponding to logical storage resources into which no data has been written as idle.

15. The non-transitory computer readable storage medium of claim 13, wherein the machine readable instructions are further to cause the processor to:

record, in the storage resource mapping table, a physical location of the physical memory block corresponding to the logical storage resources into which the data has been written, and setting the state of the physical memory block as valid;

after the logical storage resource management device releases all the logical storage resources, set states of all nodes in the storage resource mapping table as invalid.

* * * * *